(12) United States Patent
Hecht

(10) Patent No.: US 8,508,793 B2
(45) Date of Patent: Aug. 13, 2013

(54) SYSTEM AND METHOD FOR CALIBRATING A DOCUMENT PROCESSING DEVICE FROM A COMPOSITE DOCUMENT

(75) Inventor: David L. Hecht, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 424 days.

(21) Appl. No.: 12/494,192

(22) Filed: Jun. 29, 2009

(65) Prior Publication Data

US 2009/0262377 A1 Oct. 22, 2009

Related U.S. Application Data

(63) Continuation of application No. 10/270,698, filed on Oct. 16, 2002, now abandoned.

(51) Int. Cl.
*G06K 1/00* (2006.01)
*G06K 7/00* (2006.01)
*G06K 9/00* (2006.01)

(52) U.S. Cl.
USPC ........... 358/1.9; 358/3.28; 358/406; 235/435; 382/100

(58) Field of Classification Search
USPC ................... 358/1.9, 3.26, 539, 3.28, 426.03; 235/494, 456; 382/309
See application file for complete search history.

(56) References Cited

U.S. PATENT DOCUMENTS

| | | | |
|---|---|---|---|
| 5,056,045 A | 10/1991 | Ohsawa | |
| 5,091,966 A * | 2/1992 | Bloomberg et al. | 382/203 |
| 5,128,525 A | 7/1992 | Stearns et al. | |
| 5,337,668 A | 8/1994 | Matsuoka et al. | |
| 5,526,444 A * | 6/1996 | Kopec et al. | 382/233 |
| 5,642,202 A * | 6/1997 | Williams et al. | 358/406 |
| 5,710,420 A * | 1/1998 | Martin et al. | 235/487 |
| 6,000,613 A * | 12/1999 | Hecht et al. | 235/456 |
| 6,076,738 A * | 6/2000 | Bloomberg et al. | 235/494 |
| 6,404,435 B1 | 6/2002 | Miller et al. | |
| 6,577,748 B2 | 6/2003 | Chang | |
| 6,819,776 B2 | 11/2004 | Chang | |
| 2004/0061327 A1* | 4/2004 | Hilton et al. | 283/72 |

OTHER PUBLICATIONS

Ming Ye et al., "Document Image Matching and Annotation Lifting," Int. Conf. Document Analysis and Recognition, Seattle WA (2001).
J. Mao et al., "Form Dropout Using Distance Transformation," Proc. Int. Conf. Image Processing, vol. 3, pp. 328-331 (1995).

* cited by examiner

*Primary Examiner* — Steven Kau
(74) *Attorney, Agent, or Firm* — Patrick J. S. Inouye; Krista A. Wittman

(57) ABSTRACT

A system and computer-implemented method for calibrating a document processing device from a composite document is disclosed. A composite document including human-readable content and machine-readable code marks is input into a document processing device. The machine-readable code marks are decoded to identify at least one spatial pointer including at least one nominal property of at least a portion of the human-readable content. The at least one nominal property is compared to an input property of the human-readable content. One or more distortions in the input property compared to the at least one nominal property are identified. The document processing device is calibrated based on the identified distortions.

20 Claims, 13 Drawing Sheets

SYSTEM AND METHOD FOR CALIBRATING A DOCUMENT PROCESSING DEVICE FROM A COMPOSITE DOCUMENT

CROSS-REFERENCE TO RELATED APPLICATIONS

This patent application is a continuation of U.S. patent application, Ser. No. 10/270,698, filed Oct. 16, 2002, abandoned, the priority filing date of which is claimed, and the disclosure of which is incorporated by reference.

The following applications are relied upon and hereby incorporated by reference in this application:

U.S. Pat. No. 5,486,686, issued Jan. 23, 1996, to Zdybel, Jr. et al., entitled "Hardcopy Lossless Data Storage And Communications For Electronic Document Processing Systems;"

U.S. Pat. No. 5,453,605, issued Sep. 26, 1995, to Hecht et al., entitled "Global Addressability For Self-Clocking Glyph Codes;"

U.S. Pat. No. 5,825,933, issued Oct. 20, 1998, to Hecht, entitled "Parallel Propagating Embedded Binary Sequence For Parameterizing Two Dimensional Image Domain Code Patterns In Two Dimensional Address Space;"

U.S. Pat. No. 6,327,395, issued Dec. 4, 2001, to Hecht et al., entitled "Glyph Address Carpet Methods And Apparatus For Providing Location Information In A Multidimensional Address Space;"

U.S. Pat. No. 6,993,655, issued Jan. 31, 2006, to Hecht et al, entitled "Record And Related Method For Storing Encoded Information Using Overt Code Characteristics To Identify Covert Code Characteristics;"

U.S. Pat. No. 5,949,055, issued Sep. 7, 1999, to Fleet et al., entitled "Automatic Geometric Image Transformations Using Embedded Signals;"

and U.S. Pat. No. 6,641,053, issued Nov. 4, 2003, to Breidenbach et al., entitled "Foreground/Background Document Processing With Dataglyphs."

FIELD

The present invention is directed to systems and methods for calibrating and correcting document processing equipment, and more particularly, to devices and methods for calibrating and correcting scanners, printers and copiers and hardcopy prints and copies and decoding machine-readable text overlaid with human-readable content.

BACKGROUND

Modern electronic document processing systems (copiers, scanners and printers) generally include input scanners for electronically capturing the general appearance (for instance, the human readable information content and the basic graphical layout) of human readable hardcopy documents; programmed computers for enabling users to create, edit and otherwise manipulate electronic documents; and printers for producing hardcopy, human readable renderings of electronic documents. These systems typically have convenient access to mass memory for the storage and retrieval of electronic document files. Moreover, they often are networked by local area networks (LANs), switched data links, and the like for facilitating the interchange of digital electronic documents and for providing multi-user access to shared system resources, such as high speed electronic printers and electronic file servers.

Prior art document processing systems present a particular challenge to the system designer, since it is essential to preserve the relative input values of the original throughout the many stages of processing required to form the desired digital image. In particular, the system electronics inherently includes analog components, which are especially susceptible to drift; frequent recalibration is thus essential.

The calibration process itself is frequently complex. Calibration is typically initially performed at the factory, where sophisticated instruments facilitate the process. Even then, because of the unique demands of modern electronic document processing systems, particularly color processing systems, the process is often time consuming, and thus costly. Further, it is generally necessary to repeat the calibration process throughout the life of the document processing system. Typically this is performed at least once at the start of a scanning run, and often is at least semi-automated. However, some systems lose calibration during the scan, and become increasingly unreliable as the run proceeds. Others are still less than satisfactory when applied to the demanding environment of color scanner calibration.

A major source of error arises from the electro-optic detector system itself. Such systems generally comprise a detector array for receiving light reflected from or transmitted through a document, and for converting that light into electric signals indicative of the intensity of the reflected or transmitted light. The intensity of the reflected or transmitted light that is measured is a function not only of the "true" intensity arising from the characteristics of the image itself, but also from extraneous interference or noise caused primarily by undesired variations in the illumination and in the characteristics of the detector array.

Additional error arises in the electronic processing circuitry that receives the output of the electro-optic detector and converts to a usable output signal, generally in digital form. Such circuitry is subject to electronic noise and drift.

Consequently, it would be a significant improvement if the error present in prior art electronic document processing systems could be minimized or eliminated by reducing the impact that illumination errors, interference, noise or drift has on the performance of the document processing system. It would also be a significant improvement if the hardcopy output of electronic document processing systems provided an unambiguous source of information that could be used to determine distortions in the print from nominal such as spatial distortions and deviations from nominal in image properties (for example, color and font) to enable the calibration and correction of document processing systems and consequent generations of copies of the document. Thus, there is a need to overcome these and other limitations of the prior art and to provide an efficient method for calibrating and correcting electronic document processing systems and document prints and copies. The present invention, as illustrated in the following description, is directed to solving one or more of the problems set forth above.

SUMMARY

In accordance with the present invention, a method for printing a human-readable document from a composite image data file comprising human-readable content and machine readable code marks, wherein the machine readable code marks comprise spatial reference pointers and image property information is disclosed. The method comprises obtaining a scanned image of the composite printed document to extract a spatial pattern of the document and other image property information. Next, the machine-readable content in the composite image is decoded to obtain reference information describing nominal spatial relationships of the human-readable and machine-readable content. The method then compares observed spatial relationships with reference spatial relationships to obtain a spatial deviation value. The spatial deviation value is then applied to the scanned image, and then a corrected image is outputted.

A further embodiment provides a system and computer-implemented method for calibrating a document processing device from a composite document. A composite document including human-readable content and machine-readable code marks is input into a document processing device. The machine-readable code marks are decoded to identify at least one spatial pointer including at least one nominal property of at least a portion of the human-readable content. The at least one nominal property is compared to an input property of the human-readable content. One or more distortions in the input property compared to the at least one nominal property are identified. The document processing device is calibrated based on the identified distortions.

BRIEF DESCRIPTION OF THE DRAWINGS

The invention will be described with reference to the following drawings in which like reference numerals refer to like elements and wherein.

DETAILED DESCRIPTION

Figure 1:
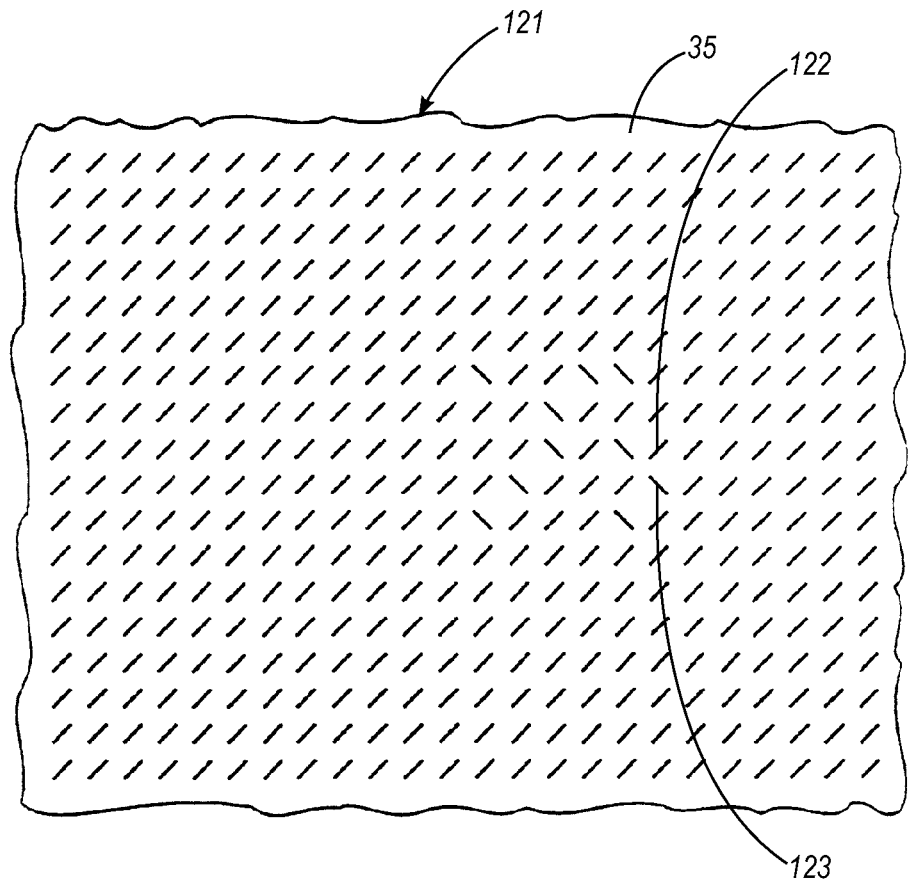
FIG. 1 is an example of a conventional self-clocking glyph code pattern.

In the following detailed description, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that algorithmic changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the drawings, in which like numerals represent like elements throughout the several figures, the present invention will be described.

Referring now to FIG. 1, there is shown a more or less conventional self-clocking glyph code pattern 121, which is composed of elongated slash-like marks or "glyphs" 122 and 123 that are written on a generally regular rectangular lattice of centers on a suitable recording medium or substrate 35. Suitably, the glyphs 122 and 123 are printed by a printer to write 5 pixel×5 pixel-20 pixel×20 pixel representations of the glyphs 122 and 123 on regularly spaced centers that are distributed widthwise and lengthwise on the substrate 35 to produce the rectangular code pattern 121. The glyphs of these fine grain glyph code patterns are not easily resolved by the unaided human eye when the code patterns are viewed under standard lighting conditions and at normal reading distances, so the code pattern 121 typically has a generally uniform gray appearance. Nevertheless, the glyph code pattern is still capable of effectively communicating machine readable digital information. To carry out this function, the glyphs 122 and 123 usually are tilted to the left and right, at about +45° and −45° with respect to the longitudinal dimension of the recording medium 124 to encode binary "1's" and "0's", respectively, as shown at 35. As will be appreciated, the printed glyphs may take various forms. For example, they may be markings, which provide two or more levels of machine readable discrimination by virtue of their shape, rotation, color or similar attributes. The area of each individual glyph mark may also be modulated to effect a halftone image of glyphs or glyphtones without changing the datamark state of each glyph.

The glyphs may be machine readable by means of human imperceptible characteristics of the print materials, such as their infrared reflectivity, their high resolution spectral detail, their metameric spectral characteristics, or their magnetization. These machine detectable materials may be incorporated into the same printing process that is employed for printing the human readable rendering, such as by utilizing xerographic toners which have machine recognizeable, human imperceptible characteristics, together with their usual visible characteristics of shape, color, whiteness, blackness, transparency and opacity.

Figure 2:
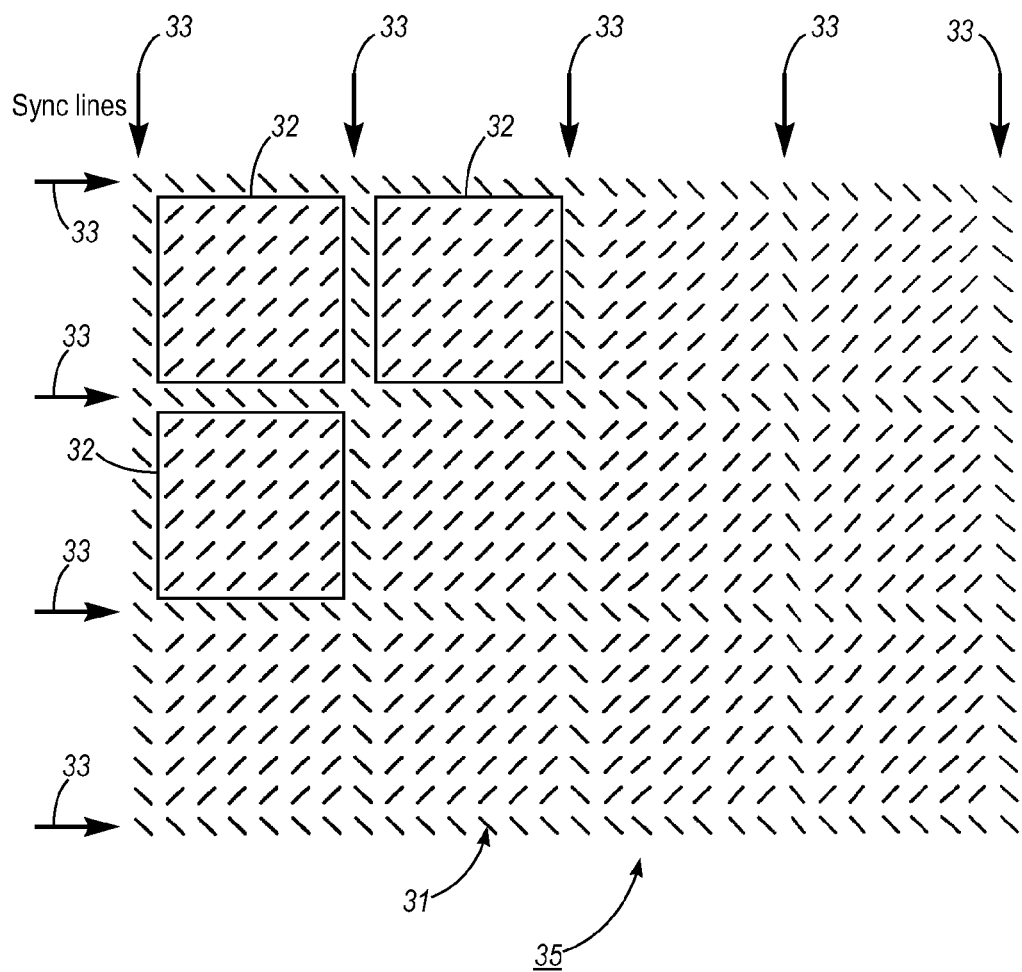
FIG. 2 is an example of a composite glyph code pattern including synchronization code and variable data code.

In accordance with this invention, as shown in FIG. 2, a composite code 31 may include a data code 32, together with a two dimensional, distributed sync code pattern 33. For illustrative clarity, the data code 32 is shown as being composed of glyphs 123 that are tilted at −45° with respect to the longitudinal axis of the substrate 35, while the sync code pattern 33 is shown as being composed of glyphs 122 that are tilted at +45° with respect to that axis. In practice, of course the angular orientation of the data glyphs 32 is modulated in accordance with the respective data values they encode. Further, the angular orientation of the sync code glyphs 33 might also be modulated in accordance with a cyclic or acyclic sequence of values. Consequently, there may not be any symbolic distinction between a given data glyph mark 32 and a given sync glyph mark 33. Indeed, in keeping with one of the more detailed features of this invention, the data glyphs 32 and the sync glyphs 33 preferably are potentially identical members of the same finite symbol set because this causes the sync code pattern 33 to visually blend with the data code 32 effectively. Moreover, to even further enhance the visual homogeneity of the composite code 31, the sync code pattern 33 advantageously is selected to avoid visually distinctive glyph patterns, such as long runs of the same symbol.

More particularly, in keeping with this invention, the sync code encoded glyph pattern 33 (sometimes referred to herein as the "sync code pattern") is composed of a predefined, cyclical or acyclical pattern of glyphs that is sufficiently distinctive to be disambiguated from the data code 32 with acceptably high statistical reliability. This sync code pattern 33 is written on a substrate 35 in accordance with the same spatial formatting rule as the data code 32, but the formatting of the sync code pattern 33 is further governed by at least one additional rule that establishes a predetermined localized geometric relationship between the spatial positioning of the glyphs 122 of the sync code pattern 33 and the spatial positioning of nearby data glyphs 32. The logical ordering of the sync code values that are encoded by the glyphs of the sync code pattern 33 is predetermined. Thus, the sync code pattern 33 defines localized spatial references for determining the logical ordering of the data glyphs 32. In one embodiment, glyphs 121 typically are printed at a predetermined spatial density in generally square lattice pattern, so the centers of the glyph defining cells (commonly referred to as the glyph centers) usually are arranged in a square lattice pattern.

As will be appreciated, the established relative position of the sync code pattern 33 and dataglyph ensures that the spatial references it provides survive replication of the document. For example, document 121 (FIG. 1) may be replicated by photocopying or facsimile transmission to provide a hardcopy replica or by bitmap input scanning to provide an electronic representation subject only to the losses that might occur if the original image and/or the copy of their composite code 31 is damaged. Advantageously, the sync code pattern 33 is distributed throughout the composite code 31 and is selected so that the density of the spatial references it provides is sufficient to locally reference all of the data glyphs 32 in the composite code 31. The sync code pattern 33 on substrate 35 may be decoded to provide unique address information and spatial reference for each location on substrate 35 in the vicinity of a glyph.

In one embodiment of the present invention, a hardcopy rendering of a source document may include a human-readable image composited with machine-readable marks. The human-readable image may include text, alphanumeric data, graphics, etc. The glyph encoded data embedded in substrate 35 may include one or more of the following: digital representation of the source document; digital representation of the document image; machine readable descriptions of the algorithms utilized for performing computations for spreadsheets; machine readable descriptions of hypertext pointer values; machine readable descriptions of some or all of the structural characteristics of the electronic source document; machine readable descriptions of the document editor used to prepare the source document; machine readable descriptions of the file name and storage location of the electronic source document; spatial reference image characteristics such as color, greyscale, and nominal undistorted position; and machine readable descriptions of audit-trail data for the electronic source document. When decoded, the glyph codes may provide portions of the human-readable content. The key reason we are able to store the machine readable representation of the document image in a small space is due to digital data compression techniques. For example, one compression technique (token-based compression) stores data describing what an 'A' looks like, and then records where similar 'A' characters are on a page. Storing the raw document image with no compression would require the use of more pixels than the document image.

Figure 3:
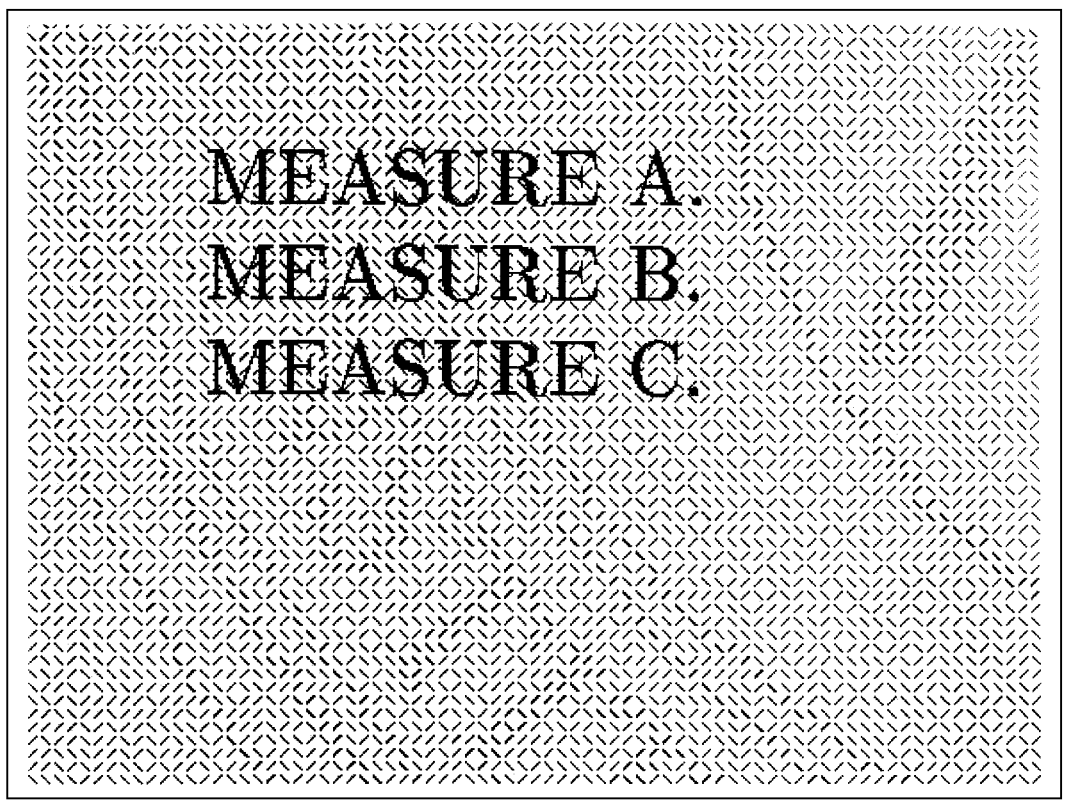
FIG. 3 is an example of human-readable content composited with glyph codes.
Figure 4:
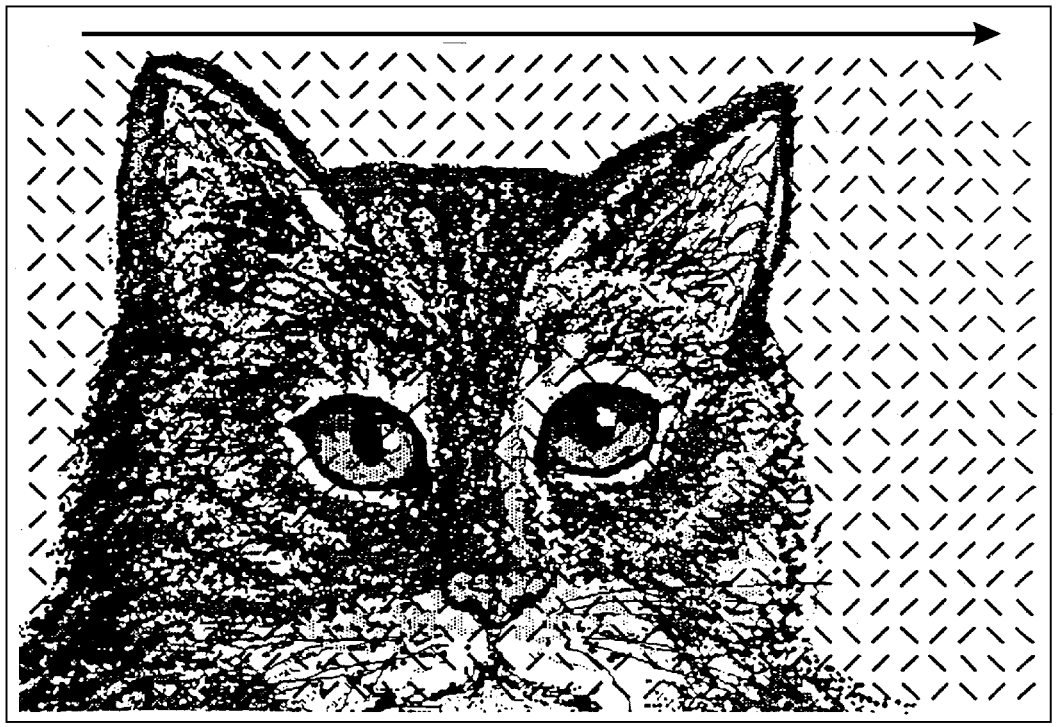
FIG. 4 is an example of a graphical image composited with glyph codes.

FIG. 3 depicts an example of human-readable content composited with glyph codes and FIG. 4 depicts an example of image data composited with glyph codes in accordance with one exemplary embodiment of the present invention. Both figures illustrate self-clocking glyph codes with parallel address codes, wherein the address code marks include a graphic and spatially reference the image positions in the graphic. Address marks may be invisible or they may be an unobtrusive color from the graphic. Both figures also reveal that portions of the machine-readable data may be obscured by the human-readable data.

By their very nature, glyphs provide spatial references to other glyphs. In other words, to read glyph data, one must know precisely where each glyph is located. When the glyphs are used to provide information about specific locations on the image, they are referred to in the present invention as spatial pointers. In one embodiment a spatial pointer includes a location identifier and supplementary information for the specified location. In this way, the spatial pointers may provide spatial references for intended mark positions in a document and they may provide nominal gray scale or color information to referenced spatial locations.

Figure 5:
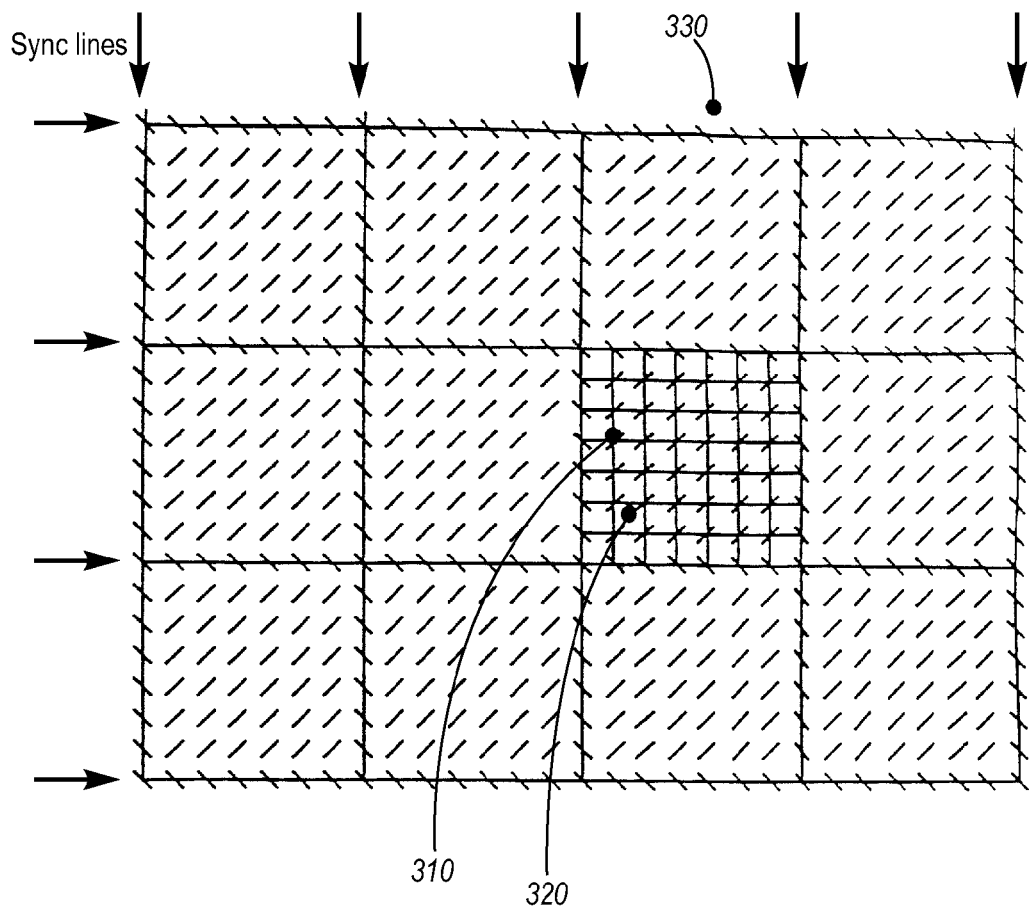
FIG. 5 is an example of a composite glyph code pattern including examples of several spatial pointer locations.

In one embodiment of the present invention, the spatial pointer may provide information about a point or a geometric area on substrate 35. When the spatial pointer refers to a point, it may characterize positions at other glyph locations, positions between glyph locations, and interpolated positions near glyph locations. These three physical locations are shown in FIG. 5 as 310, 320 and 330, respectively. FIG. 5 also illustrates data encoded glyphs printed at a predetermined spatial density in a square lattice pattern. To identify points at, between or near glyphs, three components of information are necessary: the coordinates of the starting glyph center, and the displacement in both the x and y direction in units of the lattice interval distance. The starting glyph center may be any glyph on the substrate 35, however in one embodiment, the preferred starting glyph will be the closest glyph to the identified point. For example, the starting glyph for point 310 is the glyph center directly beneath point 310. The starting glyph for point 320 is the glyph touching point 320, and the starting glyph for point 330 may be the closest variable data glyph located beneath point 330. It can therefore be seen that the present invention presents opportunities to more precisely reference the location of one or more points on a composite document. In addition to referencing points, spatial pointers may reference human-readable content. In other words, a point referenced by a spatial pointer may be the left-most, top, right-most, bottom, or other point on a human-readable letter, number or symbol. When spatial pointers are used to reference the human-readable image data, it is said that the machine-readable portion is registered with the human-readable or image portion. In other words, text, data or graphics in the foreground may have its location, placement and size referenced off of the machine-readable marks in the background. That is, text in the foreground may be positioned relative to machine-readable codes in the background. The capability to closely specify the location of letters, numbers and symbols allows a user to very precisely specify nominal positions for text and graphics on a document, even when the document image is distorted in printing, reproduction or scanning. When the machine-readable codes are printed on the same side as the human-readable information, spatial relationships may exist between various portions of the human-readable information alone or together with the machine-readable information. When the machine-readable text is printed on a separate substrate or separate side of the same substrate, the registration information is limited to various portions of the human-readable information. Storing the details of the image registration (for instance, the spatial relationships between the foreground and the background) allows a user to retrieve the details of the spatial relationships in the original image and compare them to the spatial relationships reflected in the current document to determine its fidelity to the original image. When a document containing registration information is output from a printer or copier, the document may enable the printer or copier to print the document more accurately in accordance with the registration information such that the predetermined spatial relationships are maintained in subsequent copies of the document.

Figure 6:
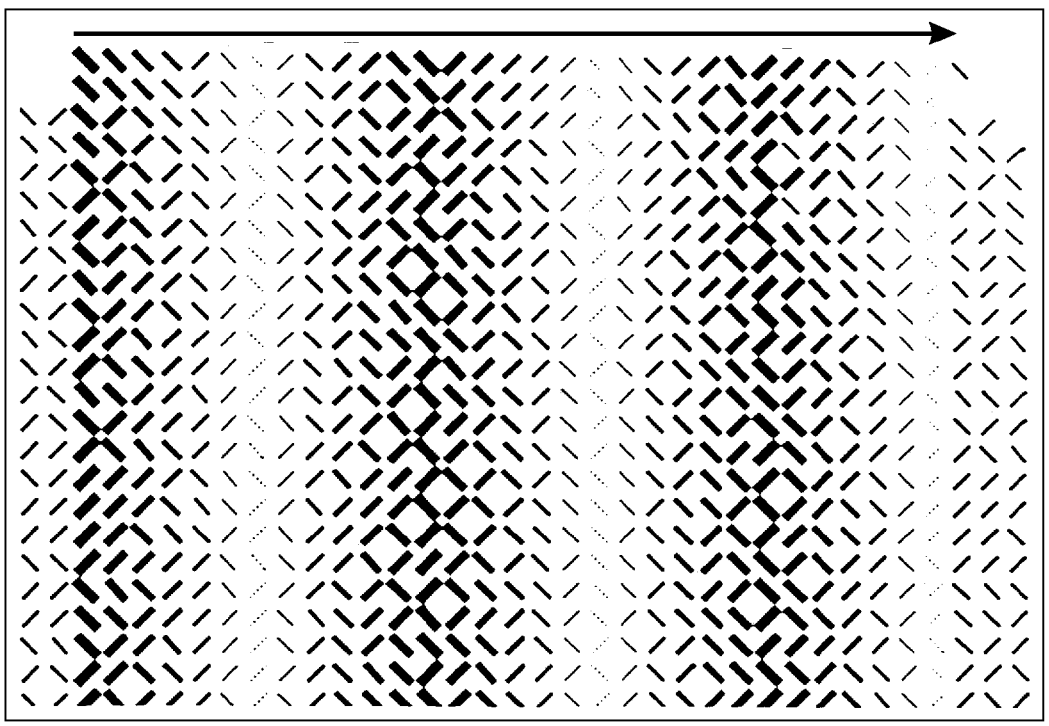
FIG. 6 is an example of a glyphtone image according to one embodiment of the present invention.

Spatial pointers may also be used when an image consists of glyphtones. Referring now to FIG. 6, there is shown a substrate comprising self-clocking glyph codes with parallel address codes, wherein the glyph codes are implemented as gray scale glyph halftones (glyphtones) by utilizing glyphs having different areas. In this case, the distance from the glyphtone to the identified physical location is still computed from the center of the glyphtone mark. The only difference is that the area occupied by each glyphtone mark may vary, depending on the grayscale or color value of the glyphtone at that cell.

When a spatial pointer points to a geometric area (for example, circle, polygon, etc.) instead of a point, the spatial pointer must include an additional component that identifies the shape of the area (for example, 1=circle, 2=square, 3=triangle, etc.) When a geometric shape is specified, the supplementary information may relate to a property of the shape. For example, when a circle is the specified geometric shape, the supplementary information may represent the radius of the circle in units of glyph lattice spacing. When a square or other polygon is identified, the supplementary information may represent the length of a diagonal, length of a major or minor axis, or it may represent the length of a side of the polygon. Area information may be explicitly encoded or may be implicit. Spatial pointers that reference areas may further include human-readable or machine-readable data that should be found inside the area.

The supplementary information may be one or more human-readable characters, physical parameters (for example, color, luminance, hue, etc.) at a specific location, predefined information from a standard, or reference values (for instance, Helvetica, Size 16 pt, dark blue) associated with the location. It may also include a pointer to record in a memory location where human-readable characters, physical characteristics or reference values may be stored. Spatial pointers may thus reference and specify the location and properties of human-readable content found in portions of the image. For example, a spatial pointer may specify that a rectangle, located in the upper left corner of a document should contain the text "Apr. 15, 2002" in 12 point, Times New Roman. Spatial pointers may also specify the appropriate degree of gray scale intensity to output at a particular location when a black and white copy of the image is generated, or they may specify a color to output at a particular location when a copy of the image is generated. For example, when a color image is copied using a gray scale copier, the color image becomes a black/white image. Through the use of spatial pointers, the color image may be regenerated when the black/white image is subsequently copied using a color copier. That way, a gray scale image may be placed on a color copier and a color image outputted.

In addition to specifying identifying information about specific segments of a document, the spatial pointers may also be used to point to physical locations on a document. The physical locations may be read by a document processor and then used to calibrate or adjust one or more operating parameters for the document processor. For example, a spatial pointer may point to an area on the document that has a particular calibration characteristic (for instance, a human-readable character, spatial scale, gray scale, etc.). An output device such as a copier, printer or scanner may then read the area, analyze the characteristics of the area to calibrate the device, and then incorporate the calibration information in subsequent operation. The calibration characteristic could also be encoded with the spatial pointer in the block of glyph marks. In another embodiment, nominal and sensed color values at calibrated pointer positions may be used to adjust the tone scale at other positions by interpolated shift from the sensed color values.

A spatial pointer may additionally be used as a covert pointer to physical positions where authenticity test features are located. For example, a covert pointer may point to marks made using a special material, such as invisible inks. In yet another embodiment, a covert spatial-pointer may point to special mark patterns made by subtle modulation distortions of glyph patterns produceable through hyperacuity printing.

Figure 7:
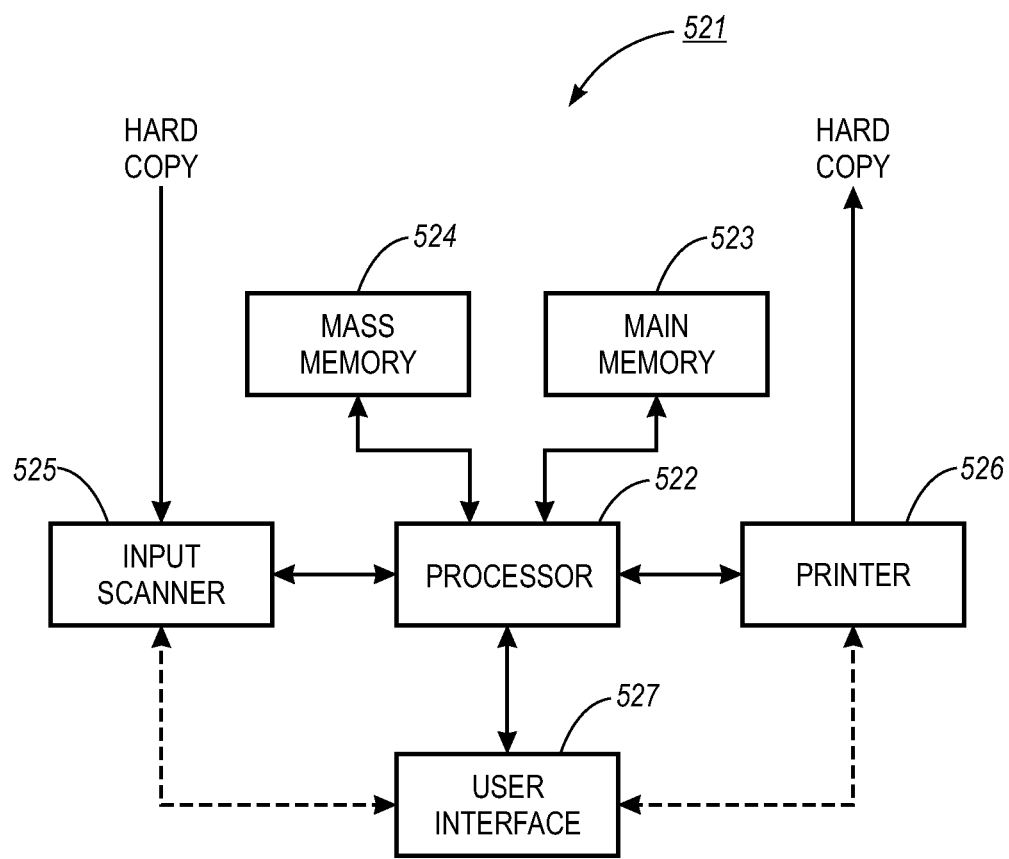
FIG. 7 is a block diagram of an electronic document processing system according to one embodiment of the present invention.

FIG. 7 is a block diagram of an electronic document processing system 521 to illustrate a typical environment for this invention. In keeping with standard practices, the document processing system 521 comprises a digital processor 522 having a main memory 523 and a mass memory 524, an input scanner 525 for scanning digital representations of selected hardcopy documents into processor 522, and a printer 526 for printing hardcopy renderings of selected ones of the files that are listed on the file directory (not shown) of processor 522. Furthermore, there is a user interface 527 for enabling a user to interact with processor 522, input scanner 525, and printer 526. In operation, a user at interface 527 inputs human-readable content into processor 522 and then inputs machine-readable text into processor 522. Processor 522 then creates a composite document comprised of the human-readable and machine-readable portions on a single document. The composite document may modify the machine-readable portion to include spatial pointers to specific portions of the human-readable content. In that case, the machine-readable text may be subsequently decoded and the spatial pointers used to verify that the proper portions of the human-readable content are in their proper locations.

Printed glyph codes of the foregoing type are susceptible to being decoded by processing bitmap images of them. As will be seen, the image processing techniques that are provided for decoding such glyph codes can tolerate a significant amount of image distortion and degradation, so codes carried by scanned-in photocopies and facsimile copies can be decoded, provided that the scanned-in document is not too many generations removed from the original. Of course, printed glyph codes can be regenerated by employing a suitable electronic document processing system for decoding the code to recover the encoded data and by then reprinting the code with that very same data encoded therein. Thus multigenerational fidelity can be extended.

In certain decoders, the image processing which is performed for decoding the glyph codes first locates the glyphs in the X-Y coordinates of the bitmap image space, constructs a table for indexing the glyphs in the spatial order in which data was encoded in them, and then analyzes the glyphs in indexed order for sequentially extracting the data values that are encoded in them. In other decoders, the image processing classifies the glyphs by their shapes while concurrently locating their centers in the bitmap image space, so the decoded values of the glyphs conveniently are indexed to the bitmap image space. These spatially indexed decoded data values may alternatively be sorted in accordance with the spatial template or pattern that governs their spatial ordering if it is desired to establish their logical order.

Figure 8:
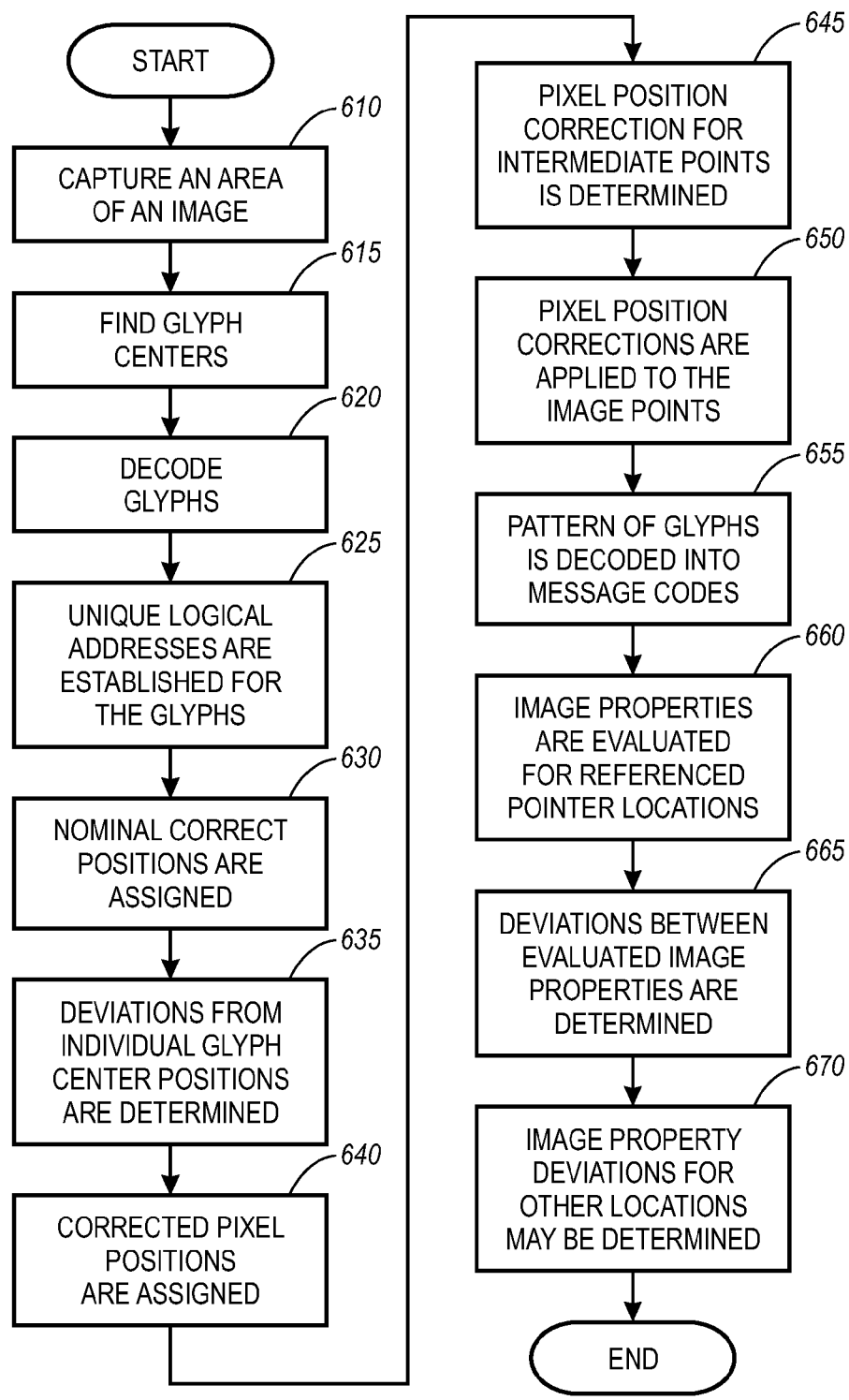
FIG. 8 is a flowchart depicting the process of decoding glyphs to determine a spatial pointer in accordance with the present invention.

FIG. 8 is a flow chart illustrating the process of detecting and decoding glyphs in a captured image to determine spatial pointers, and to use the spatial pointers to find and correct spatial distortion in the captured image with respect to an original undistorted image. In one embodiment, the process is performed by a glyph reading device coupled to a processor programmed to perform the steps in the flowchart. The process could also be performed by special purpose hardware or a combination of hardware and software. In operation, a reading device (for instance, camera, scanner or copier) captures an area of an image that includes predefined patterns of glyphs (step 610). The scanned-in image may be spatially distorted in various ways including stretching, shearing and even general warping. In step 615, individual glyphs are detected and their centers found by conventional glyph image processing. Since glyphs are predefined to be located on a known spatial pattern, typically as a square lattice, the overall lattice scaling in terms of average ratio of captured image pixel spacing to glyph lattice spacing for X and Y directions may be readily determined. In step 620, individual glyph data states are decoded using conventional dataglyph image processing. Once the glyph data states are decoded, processing flows to step 625 where unique logical addresses for the glyphs are established based on their decoded individual data values, the relative spatial positions of glyphs, and the predetermined pattern of glyphs including synchronization and address codes in accordance with conventional practice for dataglyph decoding. In step 630, nominal correct pixel positions of individual glyphs can be assigned according to the nominal predetermined pattern. Thus each glyph may serve as the fiduciary mark with a digitally addressed pointer. In step 635, deviations from individual captured image glyph center pixel positions. are then determined. These deviations establish the spatial distortion corrections for the pixel positions corresponding to glyph centers. Processing then flows to step 640 where corrected pixel positions are assigned to the glyph center points. In step 645, pixel position correction for intermediate points is then determined by interpolation among the spatial distortion corrections of surrounding glyph center points. This applies to points of both the foreground and background image components. Processing next flows to step 650, where the pixel position corrections are applied to the image points. In step 655, the pattern of glyphs is decoded into message codes using conventional dataglyph decoding practice. (Note this step may be performed at any time after step 625). The message codes may include one or more pointers to locations in the nominal image referenced to the locations of uniquely addressed glyphs. The pointer locations may include any or all points in the image. The messages codes may alternatively include explicit information about the nominal image property, such as color parameters, grey scale value and text font at the referenced spatial position or in a region neighboring the reference position. The location references will typically be defined in terms of glyph lattice units and may be defined explicitly in the message codes. Message codes are decoded into message information. The message information may be augmented by predefined standards and external reference information which may be cited in the messages or may be implicit in the process. In step 660, the image properties (for example, color parameters, grey level, font, etc.) are evaluated for the referenced pointer locations, and in step 665, deviations and disparities between the evaluated image properties are determined. Processing next flows to step 670 where image property deviations for other locations and regions may be determined. For example, grey scale and color deviations may be estimated by interpolation in color space based on values determined at pointer reference locations having colors surrounding, in color space, the values found at various points in the captured image. In step 675, the determined deviation values may be applied to correct the parameters of the captured image for further use.

Figure 9:
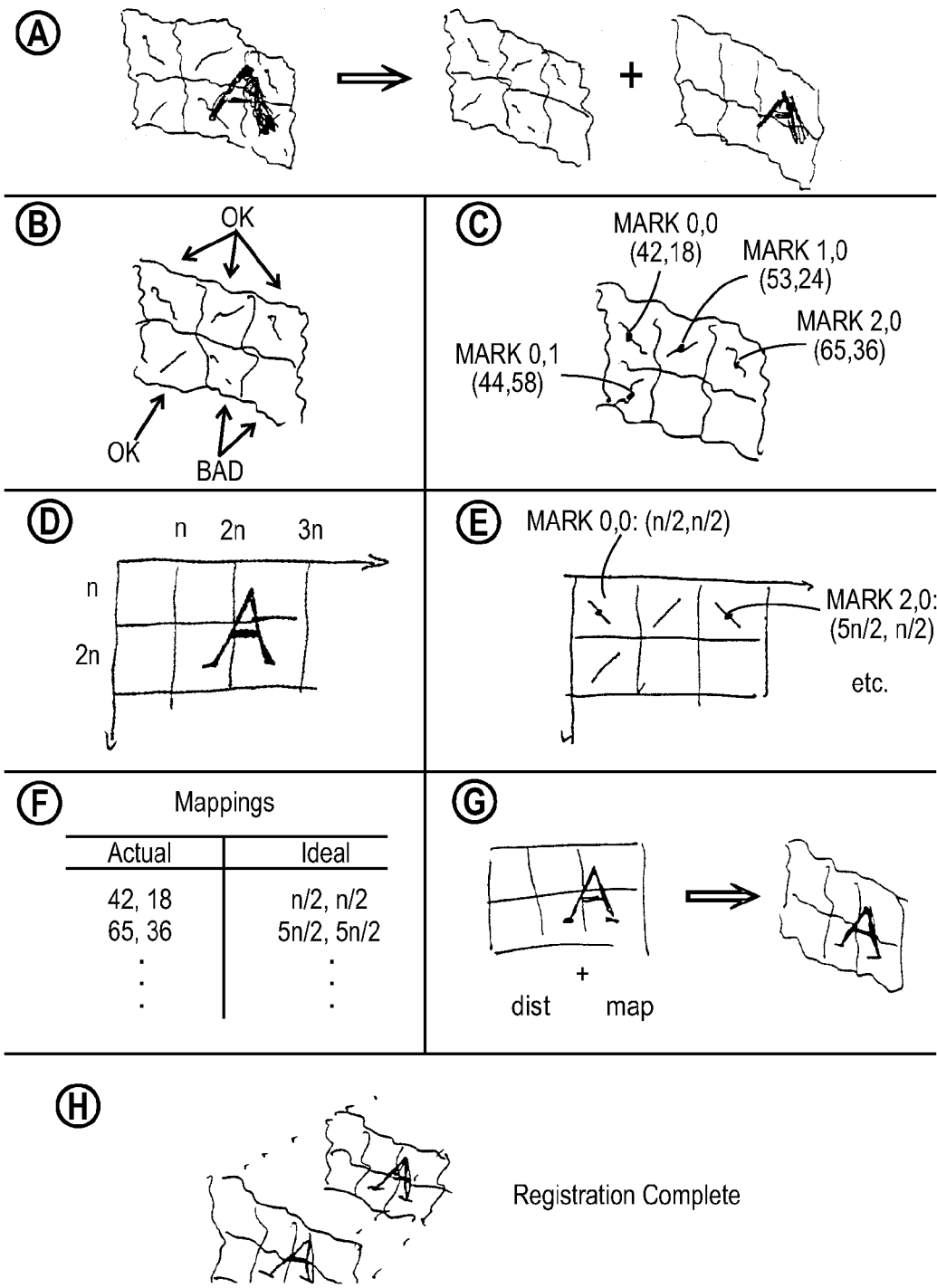
FIG. 9 is a diagram of the process for determining distortion correction of a composite document.

As previously pointed out, the data encoded glyphs typically are printed at a predetermined spatial density in generally square data arrays or blocks, so the glyph centers usually are arranged in a generally rectangular configuration. Referring to FIG. 9E, it is shown that the ideal coordinates of the glyph center located in the upper left corner of the lattice (0,0) is (n/2, n/2), and the ideal coordinates of the glyph center located two glyphs to the right of the upper left corner (2,0) is (5n/2, 5n/2). Similarly, the glyph mark located at (0,1) would have ideal glyph center coordinates of (n/2, 3n/2). Therefore, the distortion correction factors suitably are computed from the X-Y bitmap image space coordinates of the apparent center pixels of the glyphs of the printed glyph code. Thus, as illustrated in FIG. 9F, the actual X-Y coordinates of one after another of the glyphs are identified for each readable glyph, until a distortion map for the entire image has been prepared. The distortion map may then be used to match up the actual positions of the reference glyph marks with their ideal (for instance, non-distorted) positions. The distortion map as shown in FIG. 9F, is a listing of the actual and ideal coordinates for each readable glyph. The difference between the actual and ideal coordinates constitutes the distortion correlation for the image. Once distortion correlation information has been computed, processing flows to step 606 (FIG. 8) where the distortion correlation information is applied to the captured image to create a distortion-corrected image. The glyphs on the distortion-corrected image are then converted to a matrix of 0's and 1's. The matrix is then analyzed to identify synchronization lines (step 608). After identifying the synchronization lines, the variable data in the blocks defined by the synchronization lines is decoded (step 610) and then the spatial pointer is interpreted from the variable data (step 612). Using the spatial pointer, processing continues by performing an operation associated with information at the location indicated by the spatial pointer (step 614). The operation may be an authentication or a correction of the image.

Figure 10:
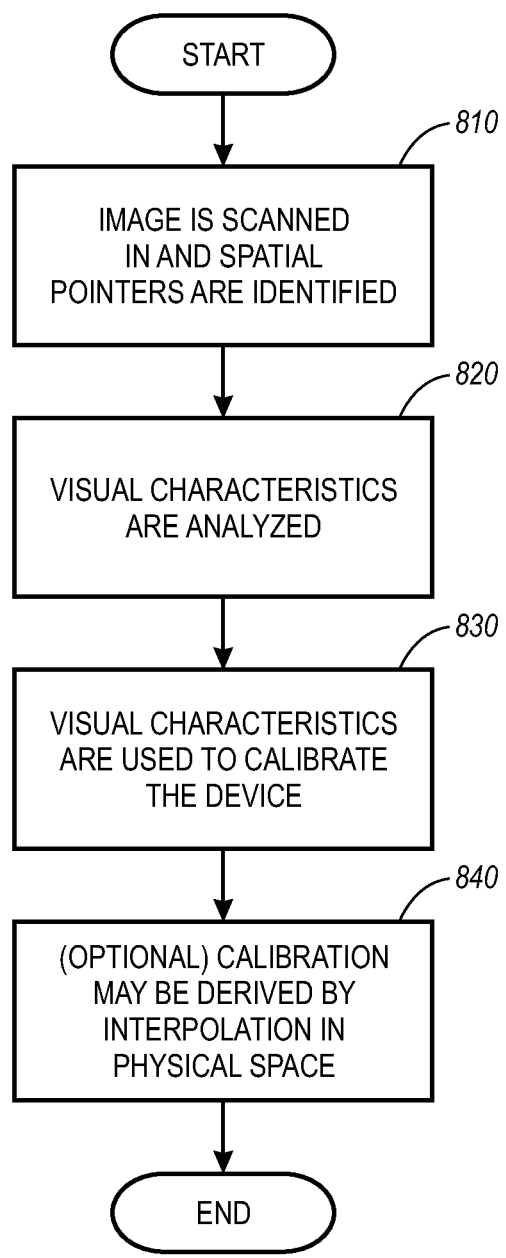
FIG. 10 is a flowchart depicting the process of calibrating a scanner, copier or printer in accordance with one embodiment of the present invention.

Referring to FIG. 10, there is shown a flowchart depicting the steps performed by the present invention to calibrate a scanner. As shown, the process begins in step 810 when the image is scanned in and the glyph marks are read and decoded to derive spatial pointers referencing spatial positions in the scanned image and nominal image properties at some of the positions. The processor then analyzes scanned image data properties (for example, position, hue, radiance, luminance) of the locations of the image referenced by the spatial pointers (step 820). The deviations of the indicated properties from reference nominals are then used to calibrate the scanner at those referenced locations (830). For other locations, calibration may be derived by interpolation in physical space for position and interpolation in image property space for other image properties such as color parameters (840).

Figure 11:
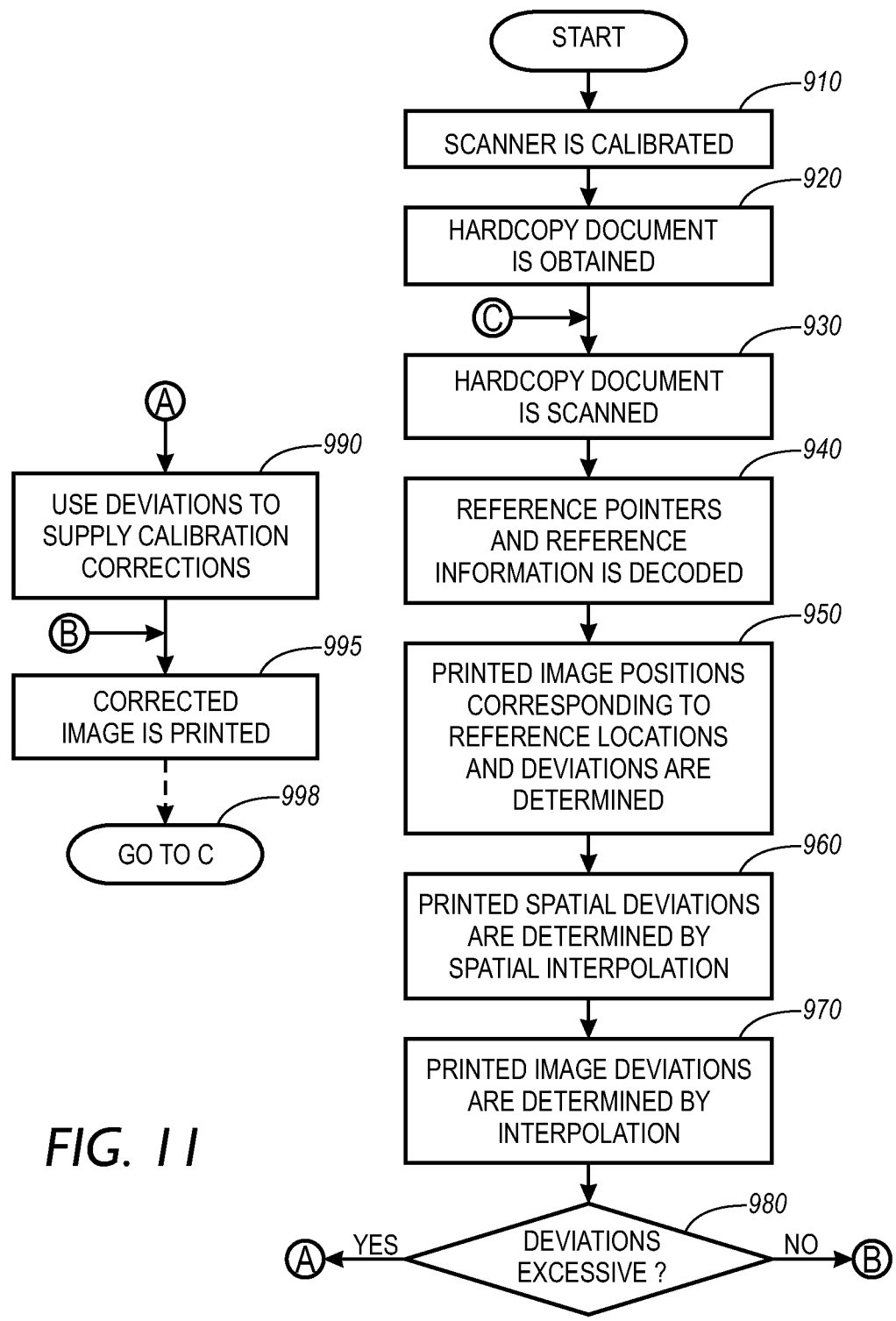
FIG. 11 is a flowchart depicting the process of correcting a printer and its prints in accordance with one embodiment of the present invention.

Referring to FIG. 11, there is shown a flowchart depicting the steps performed by the present invention to correct a printer and its prints. The correction process begins when a scanner is calibrated in accordance with FIG. 10, or a calibrated scanner is otherwise obtained (step 910). A hardcopy document having embedded data code with pointers is next obtained (step 920). Processing then flows to step 930 where the printed image is scanned in using the calibrated scanner. Once the image is scanned in, processing flows to step 940 where the present system then decodes reference, pointers and reference information. The system then determines printed image positions corresponding to reference locations and the deviations from nominal reference position and nominal image properties [for example, color] as referenced by pointers in the image (step 950). Processing then flows to step 960 where printed position spatial deviations for other image points are determined by spatial interpolation. Next, processing flows to step 970 where the present system determines printed image property deviations for other image points by interpolation among pointer calibrated references in corresponding image characteristic space (for example, color space). The present system next tests whether deviations are excessive for a satisfactory print or copy (step 980). If deviations are excessive, processing flows to step 990. If deviations are not excessive, processing flows to step 995. In step 990, the present system uses the deviation information to supply calibration corrections to the printer (copier) including corresponding image processing. Processing then flows to step 995. In step 995, a corrected image is printed. The present system may then loop back to step 930 at which time the image may be rescanned to recheck the corrected process print (step 998). Processing then terminates.

Figure 12:
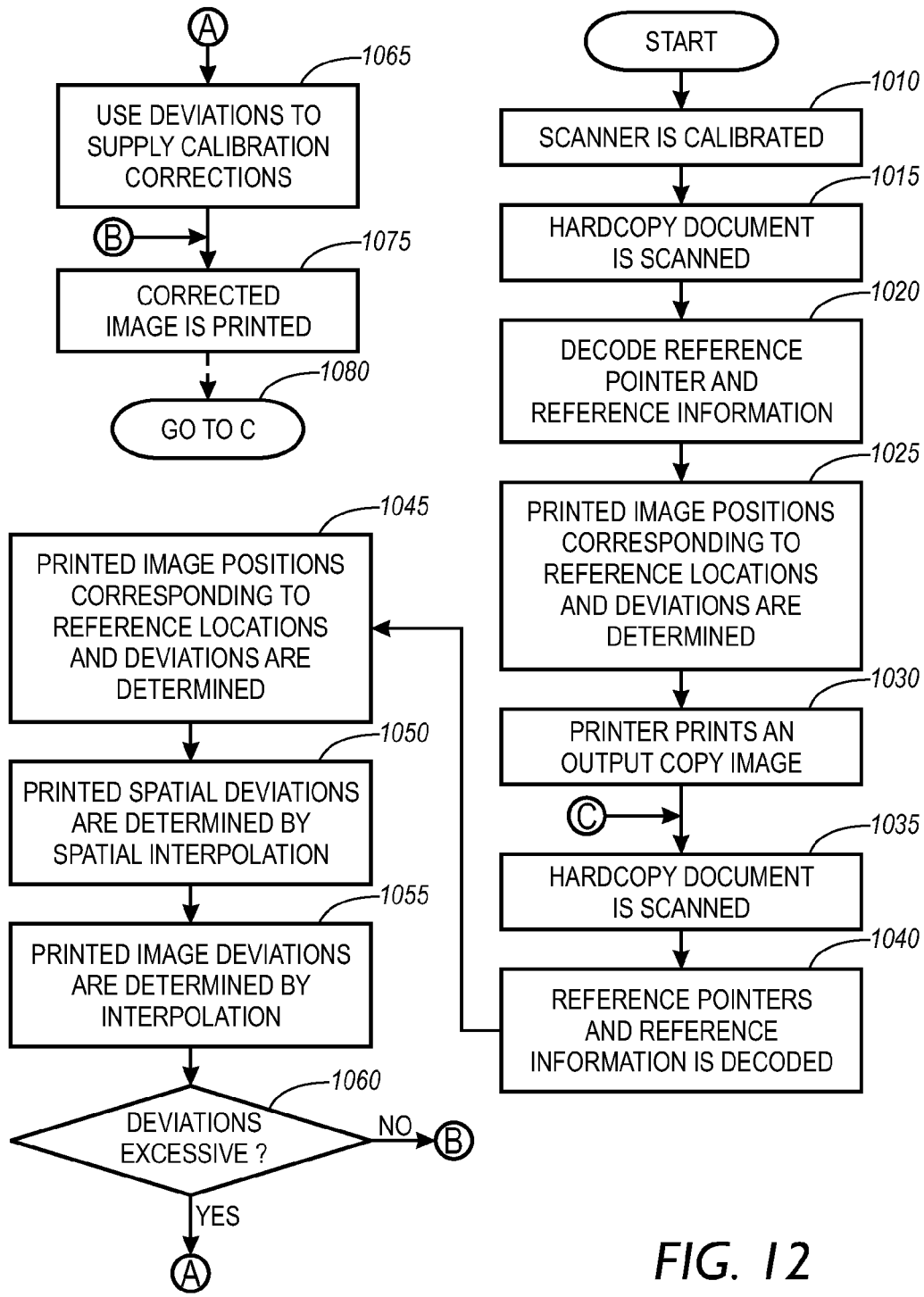
FIG. 12 is a flowchart depicting the process of correcting a copier to produce fidelity copies of input hardcopies and optionally to correct properties of the output hardcopies closer to nominal references embedded in the input hardcopies which may themselves be printed with deviations in the properties in accordance with one embodiment of the present invention.

Referring to FIG. 12, there are shown steps for correcting a copier and its copies. The correction process begins when a scanner is calibrated in accordance with FIG. 10, or a calibrated scanner is otherwise obtained (step 1010). Processing then flows to step 1015 where the printed image with embedded data codes and pointers is scanned in using the calibrated scanner. Once the image is scanned in, processing flows to step 1020 where the present system then decodes reference pointer and reference information. The system then determines printed image positions corresponding to reference locations and the deviations from nominal reference position and nominal image properties [for example, color] as referenced by pointers in the image (step 1025). Processing then flows to step 1030 where the printer prints an output copy image having embedded data codes with pointers. Next, processing flows to step 1035 where the present system then scans in the copy using the calibrated scanner. Once the image is scanned in, processing flows to step 1040 where the present system then decodes reference pointer and reference information from the scan of the copy. The printer then determines printed image positions corresponding to reference locations and the deviations from nominal reference position and nominal image properties [for example, color] as referenced by pointers in the image (step 1045). Processing then flows to step 1050 where printed position spatial deviations for other image points are determined by spatial interpolation. Next, processing flows to step 1055 where the present system determines printed image property deviations for other image points by interpolation among pointer calibrated references in corresponding image characteristic space (for example, color space). The present system next tests whether deviations are excessive for a satisfactory print or hardcopy (step 1060). If deviations are excessive, the deviation information is used to supply calibration corrections for producing a corrected copy including corresponding image processing (step 1065). Note that the corrected copy may be corrected to closely approximate the input hardcopy or optionally to adjust properties closer to the referenced nominal values. Processing then flows to step 1075. If deviations are not excessive, processing flows to step 1075. In step 1075, a corrected image is printed. The present system may then loop back to step 1035 at which time the image may be rescanned to recheck the corrected process print (step 1080). Processing then terminates.

Figure 13:
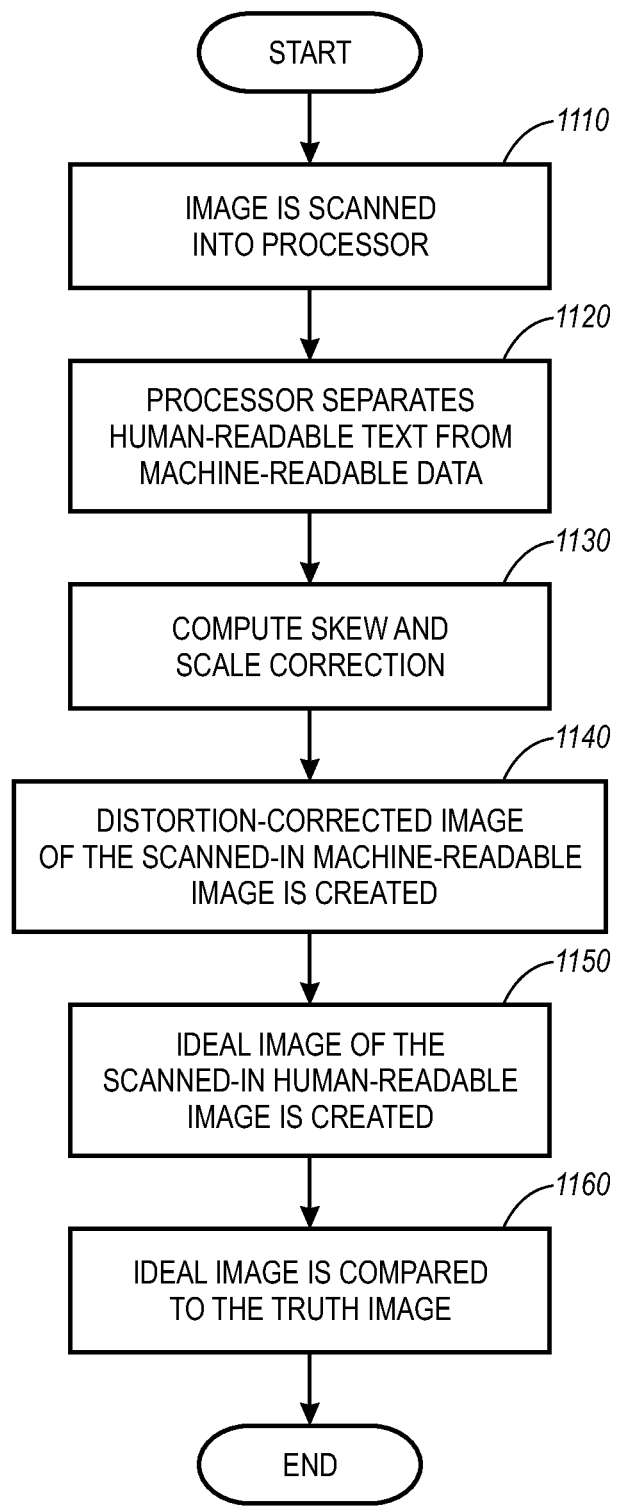
FIG. 13 is a flowchart depicting the process of comparing a reference document with a scanned-in version of the document in accordance with one embodiment of the present invention.

Referring now to FIG. 13, there is shown a flowchart depicting the steps performed when a user with a composite document wishes to compare that document with the original or reference version. For purposes of this disclosure, the composite document is the original document with modifications (perceptible and imperceptible) that may have been made to it, and the reference version is the original document (regenerated from the machine-readable codes on the composite document). Processing begins at step 1110 when the user first scans the composite document into processor 522. Processor 522 then separates the human-readable content (foreground) from the machine-readable text (background) (step 1120). A graphical depiction of the process of separating the foreground from the background is shown in FIG. 9A. When the foreground is separated from the background, some of the glyph marks that were in the background may be determined to be partially or fully obscured by the human-readable content and therefore unreadable. Referring to FIG. 9B, there is shown a graphical depiction of a series of background glyphs after the foreground text has been removed. As shown, some of the glyphs are completely intact, some are partially obscured, and at least one glyph is totally obscured. The data storage capabilities of glyphs permit large amounts of data to be stored in very small space thereby permitting redundant storage of information such that portions of the glyph carpet may be obscured without impacting data retrieval from the glyph carpet.

Processing then flows to step 1130 (FIG. 13) where processor 522 determines whether the scanned-in image of the glyph code which is to be decoded may be skewed from the horizontal in a clockwise or counterclockwise direction, and/or may be distorted by scaling errors along its X-axis and/or its Y-axis. Once a bit map characterizing the distortion of the scanned-in image has been completed, a distortion-corrected image of the scanned-in image maybe created (step 1140). Processor 522 then decodes the machine-readable data to retrieve a digital representation of the reference version of the document. Since the foreground image is registered with the background glyph carpet, the distortion correlation information from the background glyphs is next applied to the scanned-in human-readable content to create an ideal human-readable image (step 1150). Referring to FIG. 9G, it is shown that the ideal human-readable image may correspondingly be converted back to the actual image using the distortion map. The reference document and the distortion-corrected image (plus the distortion map) may then be compared to identify differences between the two documents.

Once the ideal human-readable image is created, processing flows to step 1160, where the pixel coordinates of the human readable image are compared with the pixel coordinates of the reference image (for example, by subtraction) to identify differences between the distortion-corrected image and the original or reference image. In other words, the reference image, which reflects the proper position of the characters as reflected in the original image, is compared with the ideal (non-distorted) image of the scanned-in image. In this way, minor modifications (perceptible and imperceptible) may be identified.

From the foregoing description, it will be appreciated that the present invention provides an efficient system and method for creating and decoding documents containing machine-readable text overlaid with human-readable content. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 6 and 8-10. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and, therefore, no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A system for calibrating a document processing device from a composite document, comprising:
   an input device to receive input of a composite document comprising an image human-readable content located in a foreground of the document and positioned relative to machine-readable code marks located in a background that are registered with the human-readable content and are encoded with at least one spatial pointer comprising a location identifier and supplementary information comprising at least one of human-readable characters, physical parameters, predefined information, and reference values for an ideal version of the human-readable content into a document processing device;
   a decoding module to decode the machine-readable code marks to determine the location identifier and the supplementary information, wherein the location identifier comprises spatial relationships of the relative positions between the foreground and the background for the ideal version of the human-readable content;
   a comparison module to compare the spatial relationships of the ideal version of the human-readable content with spatial relationships between the foreground and the background of the composite document and to identify distortions based on the comparison; and
   a calibration module to calibrate the document processing device based on the identified distortions.

2. A system according to claim 1, further comprising:
   an analysis module to analyze the distortions for one or more deviation values; and
   a deviation module to apply the one or more deviations values to the input composite document.

3. A system according to claim 1 further comprising:
   an output device to output the input composite document as a corrected composite document.

4. A system according to claim 1, wherein the machine-readable code marks are decoded to identify at least one other spatial pointer comprising at least one nominal property of at least a portion of the machine-readable code marks, wherein the other spatial pointer comprises at least one image property including color parameters, grey scale value, or text font.

5. A system according to claim 1, wherein the composite document is input by capturing an image of a printed composite document.

6. A system according to claim 1, wherein the supplementary information comprises at least one of position, size, shape, color, grey scale, hue, luminance, and radiance.

7. A system according to claim 1, further comprising:
correcting the input composite document based on the distortions to create a corrected composite document; and
an output device to print the corrected composite document.

8. A system according to claim 1, wherein the document processing device is one of a scanner, copier, and printer.

9. A system according to claim 1, wherein the machine-readable code marks encode authentication features.

10. A system according to claim 1, wherein the machine-readable coder marks comprise self-clocking glyph codes.

11. A computer-implemented method for calibrating a document processing device from a composite document, comprising the steps of:
inputting into a document processing device, a composite document comprising an image of human-readable content located in a foreground of the document and positioned relative to machine-readable code marks located in a background that are registered with the human-readable content and are encoded with at least one spatial pointer comprising a location identifier and supplementary information comprising at least one of human-readable characters, physical parameters, predefined information, and reference values for an ideal version of the human-readable content;
decoding the machine-readable code to determine the location identifier and the supplementary information, wherein the location identifier comprises spatial relationships of the relative positions between the foreground and the background for the ideal version of the human-readable content;
comparing the spatial relationships of the ideal version of the human-readable content with spatial relationships between the foreground and the background of the composite document and identifying distortions based on the comparison; and
calibrating the document processing device based on the identified distortions,
wherein the steps are performed on a suitably-programmed computer.

12. A method according to claim 11, further comprising:
analyzing the distortions for one or more deviation values; and
applying the one or more deviations values to the input composite document.

13. A method according to claim 11, further comprising:
outputting the input composite document as a corrected composite document.

14. A method according to claim 11, further comprising:
decoding the machine-readable code marks to identify at least one other spatial pointer comprising at least one nominal property of at least a portion of the machine-readable code marks, wherein the other spatial pointer comprises at least one image property including color parameters, grey scale value, or text font.

15. A method according to claim 11, wherein the composite document is input by capturing an image of a printed composite document.

16. A method according to claim 11, wherein the supplementary information comprises at least one of position, size, shape, color, grey scale, hue, luminance, and radiance.

17. A method according to claim 11, further comprising:
correcting the input composite document based on the distortions to create a corrected composite document; and
printing the corrected composite document.

18. A method according to claim 11, wherein the document processing device is one of a scanner, copier, and printer.

19. A method according to claim 11, wherein the machine-readable code marks encode authentication features.

20. A method according to claim 11, wherein the machine-readable coder marks comprise self-clocking glyph codes.

* * * * *